US012361876B2

(12) United States Patent
Park et al.

(10) Patent No.: US 12,361,876 B2
(45) Date of Patent: Jul. 15, 2025

(54) DISPLAY DEVICE AND METHOD FOR PROVIDING LOW LUMINANCE POWER THEREFOR

(71) Applicant: LG DISPLAY CO., LTD., Seoul (KR)

(72) Inventors: Kwangpyo Park, Seoul (KR); Bonghwan Kim, Dong-gu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/212,944

(22) Filed: Jun. 22, 2023

(65) Prior Publication Data

US 2023/0360602 A1 Nov. 9, 2023

Related U.S. Application Data

(63) Continuation of application No. 17/513,234, filed on Oct. 28, 2021, now Pat. No. 11,727,875.

(30) Foreign Application Priority Data

Dec. 22, 2020 (KR) ........................ 10-2020-0181151

(51) Int. Cl.
*G09G 3/3233* (2016.01)
*G09G 3/3225* (2016.01)
(Continued)

(52) U.S. Cl.
CPC ......... *G09G 3/3233* (2013.01); *G09G 3/3225* (2013.01); *G09G 3/3258* (2013.01);
(Continued)

(58) Field of Classification Search
CPC ......... G09G 3/3233; G09G 2320/0626; G09G 2320/0673; G09G 3/3291;
(Continued)

(56) References Cited

U.S. PATENT DOCUMENTS 9,129,559 B2 9/2015 Park et al.
9,823,729 B2 11/2017 An et al.
(Continued)

FOREIGN PATENT DOCUMENTS

CN 101847364 A 9/2010
CN 104517568 A 4/2015
(Continued)

OTHER PUBLICATIONS

Korean Office Action dated Dec. 25, 2023 issued in Patent Application No. 10-2020-0181151 (6 pages).
(Continued)

*Primary Examiner* — Dismery Mercedes
(74) *Attorney, Agent, or Firm* — Fish & Richardson P.C.

(57) ABSTRACT

An organic light emitting display device and a method for providing low luminance power thereof includes a data driver including a lookup table storing therein a low potential voltage and an initialization voltage corresponding to each gamma set such that a low potential voltage and an initialization voltage in a 60 Hz operation mode are respectively different from a low potential voltage and an initialization voltage in a 90 Hz operation mode and a method compensates for an anode charging time in the low luminance range, thereby improving seamlessness.

14 Claims, 11 Drawing Sheets

(51) Int. Cl.

| | |
|---|---|
| ***G09G 3/3258*** | (2016.01) |
| ***G09G 3/3266*** | (2016.01) |
| ***G09G 3/3275*** | (2016.01) |
| ***G09G 3/3291*** | (2016.01) |
| ***G09G 3/36*** | (2006.01) |

(52) U.S. Cl.

CPC ......... *G09G 3/3266* (2013.01); *G09G 3/3275* (2013.01); *G09G 3/3291* (2013.01); *G09G 3/3607* (2013.01); *G09G 2310/027* (2013.01); *G09G 2310/08* (2013.01); *G09G 2320/0233* (2013.01); *G09G 2320/0271* (2013.01); *G09G 2320/0276* (2013.01); *G09G 2320/0626* (2013.01); *G09G 2320/0673* (2013.01)

(58) Field of Classification Search

CPC ..... G09G 2320/0233; G09G 2320/045; G09G 3/3275; G09G 3/3258; G09G 3/2007; G09G 2360/16; G09G 2300/0819; G09G 2300/0861; G09G 2320/0276; G09G 2340/0435; G09G 2300/0866; G09G 2310/027; G09G 2320/0271

See application file for complete search history.

(56) References Cited

U.S. PATENT DOCUMENTS

| | | | | |
|---|---|---|---|---|
| 9,847,056 | B2 | 12/2017 | Shimizu et al. | |
| 10,210,808 | B2 | 2/2019 | Jung et al. | |
| 10,325,552 | B2 | 6/2019 | Jeong et al. | |
| 10,522,075 | B2 * | 12/2019 | Pyo | G09G 3/3233 |
| 10,586,496 | B2 | 3/2020 | Kim et al. | |
| 11,004,399 | B2 | 5/2021 | Park et al. | |
| 11,107,422 | B2 | 8/2021 | Lee et al. | |
| 11,120,742 | B2 * | 9/2021 | Hwang | G09G 3/3233 |
| 11,195,474 | B2 | 12/2021 | Yoo et al. | |
| 11,308,841 | B2 | 4/2022 | Sato et al. | |
| 11,380,269 | B2 | 7/2022 | Lee et al. | |
| 11,462,177 | B2 * | 10/2022 | Han | G09G 3/3233 |
| 11,694,634 | B2 * | 7/2023 | Kim | G09G 3/3233 345/690 |
| 11,727,875 | B2 | 8/2023 | Park et al. | |
| 2007/0080907 | A1 | 4/2007 | Park et al. | |
| 2014/0168188 | A1 | 6/2014 | Jun et al. | |
| 2015/0138251 | A1 * | 5/2015 | Pyo | G09G 3/3233 345/82 |
| 2017/0186375 | A1 * | 6/2017 | Jung | G09G 3/3233 |
| 2018/0293944 | A1 * | 10/2018 | Kim | G09G 3/3233 |
| 2019/0035353 | A1 * | 1/2019 | Lee | G09G 3/003 |
| 2019/0130835 | A1 * | 5/2019 | Ka | G09G 3/2092 |
| 2019/0266941 | A1 * | 8/2019 | Pyo | G09G 3/3225 |
| 2021/0174742 | A1 * | 6/2021 | Hwang | H02M 3/158 |
| 2021/0201823 | A1 * | 7/2021 | Han | G09G 3/3233 |
| 2022/0148521 | A1 | 5/2022 | Kim | |
| 2022/0301484 | A1 | 9/2022 | In et al. | |
| 2022/0343848 | A1 * | 10/2022 | Jeon | G09G 3/3233 |
| 2023/0360602 | A1 | 11/2023 | Park et al. | |

FOREIGN PATENT DOCUMENTS

| | | | |
|---|---|---|---|
| CN | 109410838 | A | 3/2019 |
| CN | 111883052 | A | 11/2020 |
| KR | 10-2007-0040149 | A | 4/2007 |
| KR | 2015-0121141 | A | 10/2015 |
| KR | 20170078916 | A | 7/2017 |
| KR | 10-2020-0036781 | A | 4/2020 |
| KR | 2022-0090191 | A | 6/2022 |

OTHER PUBLICATIONS

Korean Notice of Allowance dated Feb. 28, 2024 issued in Patent Application No. 10-2020-0181151 (6 pages).

Chinese Office Action dated Dec. 29, 2023 issued in Patent Application No. 202111150518.X w/English Translation (20 pages).

* cited by examiner

DISPLAY DEVICE AND METHOD FOR PROVIDING LOW LUMINANCE POWER THEREFOR

CROSS-REFERENCE TO RELATED APPLICATIONS

This application is a continuation of U.S. patent application Ser. No. 17/513,234, filed on Oct. 28, 2021, which claims the priority benefit of Korean Patent Application No. 10-2020-0181151 filed on Dec. 22, 2020, which are hereby incorporated by reference in their entirety for all purposes as if fully set forth herein.

BACKGROUND

Field of the Disclosure

The present disclosure relates to a display device and a method for providing a low luminance power therefor, in which a difference between a low potential voltage (ELVSS) and an initialization voltage (Vini) in a 90 Hz operation mode of the display device is set to be larger than that in a 60 Hz operation mode thereof, thereby compensating for an anode charging time.

Description of the Background

131 In general, in an organic light-emitting display device, an organic electroluminescent diode (OLED) of a display panel has high luminance and low operation voltage characteristics. The organic light-emitting display device is a self-luminous. Therefore, the organic light-emitting display device has a high contrast ratio and is implemented as an ultra-thin display. Further, a response time thereof is several microseconds (μs), and thus the device easily implements a moving image. The device has no limitation in a viewing angle and has a stable characteristic even at low temperatures.

In the organic electroluminescent diode (OLED), an anode is connected to a drain electrode of a driving thin-film transistor (D-TFT), and a cathode is grounded (VSS). An organic light-emitting layer is formed between the cathode and the anode.

In the above-described organic light-emitting display device, when a data voltage (Vd) is applied to a gate electrode of the driving thin-film transistor, a current between a drain and a source flows according to a voltage (Vgs) between a gate and the source and is supplied to the organic electroluminescent diode. This organic light-emitting display device controls a gray level of the image by controlling an amount of current flowing through the organic electroluminescent diode through the driving thin-film transistor.

SUMMARY

The above-described organic light-emitting display device controls brightness of the self-emissive OLED by controlling an amount of current applied to the OLED using a TFT element mounted on each pixel. In this connection, a dimming scheme in which as luminance decreases, a light-emitting time duration linearly decreases is used.

In this dimming scheme, the organic light-emitting display device receives luminance data from an external component and then selects one gamma set corresponding to the luminance data from a plurality of gamma sets, and provides dimming data corresponding to the selected gamma set to the OLED element.

In the organic light-emitting display device, when an operation mode switches from a 60 Hz operation mode to a 90 Hz operation mode, the mode change is not recognized in a high luminance (>10 nit) range, while the mode switching is recognized in a low luminance (<10 nit) range.

This is caused by a variation (low luminance) in an anode charging time based on a time duration of one frame. That is, as a luminance level is lowered, the current flowing through a driving transistor (D-Tr) decreases such that the anode charging time increases.

Therefore, as the anode charging time increases in the low luminance range, the luminance in the 90 Hz operation mode is lower than that in the 60 Hz operation mode. Thus, seamlessness deteriorates as the variation in the luminance increases during the mode switching.

Therefore, in order to solve the above problem, the inventor of the present disclosure has invented a display device in which a difference between a low potential voltage ELVSS and an initialization voltage Vini in a 90 Hz operation mode of the display device is set to be larger than that in a 60 Hz operation mode thereof, thereby compensating for an anode charging time and thus improving seamlessness.

Further, the inventor of the present disclosure has invented a method for providing low luminance power for a display device, in which a gamma set according to luminance data of image data is selected in the 90 Hz operation mode, and then a low potential voltage ELVSS and an initialization voltage Vini are supplied to the display panel in the 90 Hz operation mode of the display device such that the low potential voltage ELVSS and the initialization voltage Vini in the 90 Hz operation mode of the display device are respectively different from a low potential voltage ELVSS and an initialization voltage Vini in the 60 Hz operation mode of the display device.

Purposes in accordance with the present disclosure are not limited to the above-mentioned purpose. Other purposes and advantages in accordance with the present disclosure as not mentioned above may be understood from following descriptions and more clearly understood from aspects in accordance with the present disclosure. Further, it will be readily appreciated that the purposes and advantages in accordance with the present disclosure may be realized by features and combinations thereof as disclosed in the claims.

In a display device according to the aspect of the present disclosure, a power supply provides high potential voltage ELVDD, low potential voltage ELVSS and initialization voltage Vini. A data driver may apply, to a display panel, the low potential voltage ELVSS and initialization voltage Vini in the 60 Hz operation mode, and the low potential voltage ELVSS and the initialization voltage Vini in the 90 Hz operation mode such that the low potential voltage ELVSS and the initialization voltage Vini in the 90 Hz operation mode of the display device are respectively different from a low potential voltage ELVSS and an initialization voltage Vini in the 60 Hz operation mode of the display device.

In a method for providing low luminance power for a display device according to the aspect of the present disclosure, a luminance controller receives luminance data to be output to the display panel, and selects the gamma set corresponding to the luminance data and provide the gamma set to the data driver. Then, the data driver obtains the low potential voltage ELVSS and the initialization voltage Vini corresponding to the gamma set from a lookup table such that the low potential voltage (ELVSS) and the initialization voltage Vini in the 90 Hz operation mode of the display device are respectively different from the low potential voltage ELVSS and the initialization voltage Vini in the 60 Hz operation mode of the display device. Then, the data driver supplies the obtained low potential voltage ELVSS and initialization voltage Vini to the display panel.

According to an aspect of the present disclosure, the low potential voltage ELVSS and the initialization voltage Vini in the 90 Hz operation mode of the display device is set to be larger than that in the 60 Hz operation mode thereof, thereby compensating for the anode charging time and thus improving the seamlessness.

Further, according to an aspect of the present disclosure, one low potential voltage ELVSS and one initialization voltage Vini is allocated per one gamma set in an optimized manner for each panel characteristic such that the low potential voltage ELVSS and the initialization voltage Vini optimized for each gamma set may be provided.

Therefore, according to the present disclosure, the low potential voltage ELVSS and the initialization voltage Vini may be changed only by selecting the gamma set.

Further, the present disclosure may implement a display device suitable for operating at the black voltage and the low gray level rather than setting and using the same low potential voltage (ELVSS) and the same initialization voltage Vini for all of the gamma sets.

Moreover, according to the present disclosure, when changing the luminance of the organic light-emitting display device, a gamma set and dimming data corresponding to each luminance may be supplied. Thus, precise dimming operation may be realized. As a result, the quality of the image output by the organic light-emitting display device may be improved.

Effects of the present disclosure are not limited to the above-mentioned effects, and other effects as not mentioned will be clearly understood by those skilled in the art from following descriptions.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings:

FIG. 10A is a graph showing compensating for an anode charging time based on a voltage gap between a low potential voltage and an initialization voltage in the case of G191 in a 90 Hz operation mode of a display device according to the aspect of the present disclosure.

FIG. 10B is a graph showing compensating for an anode charging time based on a voltage gap between a low potential voltage and an initialization voltage in the case of G150 in a 90 Hz operation mode of a display device according to the aspect of the present disclosure.

FIG. 10C is a graph showing compensating for an anode charging time based on a voltage gap between a low potential voltage and an initialization voltage in the case of G127 in a 90 Hz operation mode of a display device according to the aspect of the present disclosure.

FIG. 10D is a graph showing compensating for an anode charging time based on a voltage gap between a low potential voltage and an initialization voltage in the case of G90 in a 90 Hz operation mode of a display device according to the aspect of the present disclosure.

FIG. 10E is a graph showing compensating for an anode charging time based on a voltage gap between a low potential voltage and an initialization voltage in the case of G63 in a 90 Hz operation mode of a display device according to the aspect of the present disclosure.

FIG. 10F is a graph showing compensating for an anode charging time based on a voltage gap between a low potential voltage and an initialization voltage in the case of G48 in a 90 Hz operation mode of a display device according to the aspect of the present disclosure.

DETAILED DESCRIPTION

Figure 1:
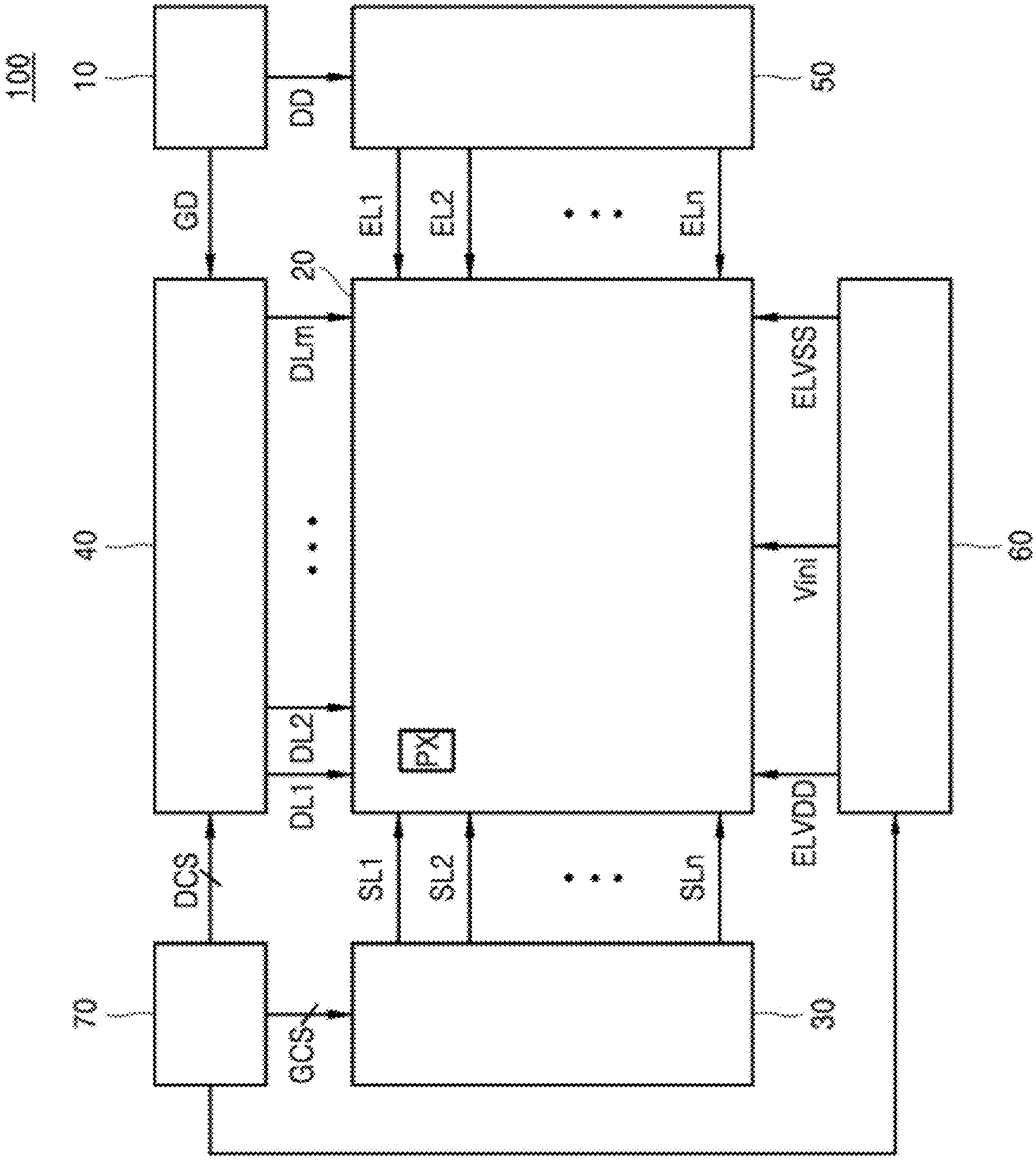
FIG. 1 is a schematic diagram showing an overall configuration of a display device according to an aspect of the present disclosure.

Advantages and features of the present disclosure, and a method of achieving the advantages and features will become apparent with reference to aspects described later in detail together with the accompanying drawings. However, the present disclosure is not limited to an aspects as disclosed below, but may be implemented in various different forms. Thus, these aspects are set forth only to make the present disclosure complete, and to completely inform the scope of the disclosure to those of ordinary skill in the technical field to which the present disclosure belongs, and the present disclosure is only defined by the scope of the claims.

A shape, a size, a ratio, an angle, a number, etc. disclosed in the drawings for describing an aspects of the present disclosure are exemplary, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular aspects only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

In descriptions of temporal relationships, for example, temporal precedent relationships between two events such as "after", "subsequent to", "before", etc., another event may occur therebetween unless "directly after", "directly subsequent" or "directly before" is indicated.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The features of the various aspects of the present disclosure may be partially or entirely combined with each other, and may be technically associated with each other or operate with each other. The aspects may be implemented independently of each other and may be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a display device and a method for providing a low luminance power of the display device according to some aspects of the present disclosure will be described.

FIG. 1 is a schematic diagram showing an overall configuration of a display device according to an aspect of the present disclosure.

Referring to FIG. 1, a display device 100 according to an aspect of the present disclosure may include a luminance controller 10, a display panel 20, a scan driver 30, a data driver 40, a light-emission controller 50, a power supply 60, and a timing controller 70.

The luminance controller 10 may provide one gamma set selected from a plurality of gamma sets, each including a plurality of gamma data, to the data driver 40, and provides dimming data corresponding to the selected gamma set to the light-emission controller 50.

The display panel 20 may include a plurality of pixels PX. In this connection, each of the pixels PX may have an organic electroluminescent diode.

In the display panel 20, a plurality of scan lines SL1 to SLn and a plurality of data lines DL1 to DLm intersect each other, and each pixel PX is defined at each intersection therebetween.

That is, in the display panel 20, the plurality of scan lines SL1 to SLn and the plurality of data lines DL1 to DLm are formed on an organic substrate or a plastic substrate and intersect with each other. Each of pixels PX corresponding to red R, green G, and blue B colors is defined at each of intersections between the scan lines SL1 to SLn and the data lines DL1 to DLm.

The scan and data lines SL1 to SLn and DLm of the display panel 20 may be respectively connected to the scan driver 30 and the data driver 40 formed outside of the display panel 20. Further, in the display panel 20, power voltage supply lines ELVDD, Vini, and ELVSS extending in a direction parallel to the data line DL are connected to each pixel PX.

Further, although not shown, each pixel PX may include at least one organic electroluminescent diode, a capacitor, a switching thin-film transistor, and a driving thin-film transistor. In this connection, the organic electroluminescent diode may be composed of a first electrode (hole injection electrode), an organic compound layer, and a second electrode (electron injection electrode).

The organic compound layer may further include various organic layers for efficiently transmitting hole or electron carriers to the light-emitting layer, in addition to the light-emitting layer that emits light. The various organic layers may include a hole injection layer and a hole transport layer positioned between the first electrode and the light-emitting layer, and an electron injection layer and an electron transport layer positioned between the second electrode and the light-emitting layer.

Further, the switching and driving thin-film transistors are connected to the scan line SL and a control signal supply line CTL (see FIG. 2) and the data line DL. The switching thin-film transistors are turned on according to a gate voltage input to the scan line SL. At the same time, a data voltage input to the data line DL is transmitted to the driving thin-film transistor. The capacitor is connected and disposed between the thin-film transistor and the power supply line, and is charged with the data voltage transmitted from the thin-film transistor and the data voltage is maintained for one frame.

Moreover, the driving thin-film transistor is connected to the power supply line VL and the capacitor, and provides a drain current corresponding to a voltage across a gate and the source to the organic electroluminescent diode. Accordingly, the organic electroluminescent diode emits light using the drain current. In this connection, the driving thin-film transistor includes a gate electrode, source electrode and a drain electrode. An anode of the organic electroluminescent diode is connected to one electrode of the driving thin-film transistor.

The scan driver 30 may apply a scan signal to the plurality of scan lines SL1 to SLn. For example, the scan driver 30 sequentially applies a gate voltage to each pixel PX on a single horizontal line basis, in response to the gate control signal GCS. The scan driver 30 may be implemented as a shift register having a plurality of stages sequentially outputting a high-level gate voltage every one horizontal period.

The data driver 40 may apply a data signal to the plurality of data lines DL1 to DLm. That is, the data driver 40 receives an image signal in a digital waveform applied from the timing controller 70 and converts the image signal into an analog data voltage having a gray level value that may be processed by the pixel PX. Further, in response to the data control signal DCS input thereto, the data driver 40 may supply the data voltage to each pixel PX through the data line DL. In this connection, the data driver 40 may convert the image signal into the data voltage using a number of reference voltages supplied from a reference voltage supply (not shown).

Further, the data driver 40 may apply the low potential voltage ELVSS and initialization voltage Vini in the 60 Hz operation mode, and the low potential voltage ELVSS and the initialization voltage Vini in the 90 Hz operation mode to the display panel 20 such that the difference between the low potential voltage ELVSS and the initialization voltage Vini in the 90 Hz operation mode of the display device is set to be larger than that in the 60 Hz operation mode thereof. For example, the data driver 40 may apply the low potential voltage ELVSS and initialization voltage Vini in the 60 Hz operation mode, and the low potential voltage ELVSS and the initialization voltage Vini in the 90 Hz operation mode to the display panel 20 such that the low potential voltage ELVSS and the initialization voltage Vini have the same value in the 60 Hz operation mode, while in the 90 Hz operation mode, the low potential voltage ELVSS and the initialization voltage Vini are different value from each other. For example, the data driver 40 may provide the low potential voltage ELVSS and the initialization voltage Vini in the 90 Hz operation mode to the display panel 20 such that the difference between the low potential voltage ELVSS and the initialization voltage Vini is greater than a certain reference value.

Further, upon receiving a selected one gamma set from the luminance controller 10, the data driver 40 may select the low potential voltage ELVSS and the initialization voltage Vini corresponding to the selected one gamma set based on the lookup table 110 and provide the selected low potential voltage ELVSS and initialization voltage Vini to the display panel 20.

The light emission controller 50 may apply a light-emission control signal to a plurality of pixels.

The power supply 60 may provide a high potential voltage ELVDD, a low potential voltage ELVSS and an initialization voltage Vini to each pixel.

The timing controller 70 may control the scan driver 30 and the data driver 40. For example, the timing controller 70 may receive the image signal, and timing signals such as a clock signal, and vertical and horizontal synchronization signals as externally applied, and may generate the gate control signal GCS and a data control signal DCS and may provide the gate control signal GCS and the data control signal DCS to the scan driver 30 and the data driver 40, respectively.

In this connection, the horizontal synchronization signal represents a time duration required to display one line of a screen. The vertical synchronization signal represents a time duration required to display a screen of one frame. Further, the clock signal refers to a reference for generating control signals for the gate and the drivers.

In one example, although not shown, the timing controller 70 may be connected to an external system through a predefined interface and may receive the image-related signals and the timing signals output therefrom at high speed without noise. The interface may employ an LVDS (Low potential voltage Differential Signal) scheme or a TTL (Transistor-Transistor Logic) interface scheme.

Further, the timing controller 70 according to an aspect of the present disclosure may incorporate therein a microchip (not shown) equipped with a compensation model that generates a compensation value for the data voltage according to a current deviation of each pixel. Thus, the voltage compensation value may be applied to the image signal to be provided to the data driver 40 so that the data voltage to be supplied from the data driver 40 is subjected to compensation based on the voltage compensation value.

In this connection, the microchip (not shown) may have a compensation model created by learning, for example, a temperature, a weighted time, average brightness, applied data signal, and an initial data signal for each pixel using a deep learning scheme. In this connection, the data signal means the data voltage. Moreover, the compensation model may be created by a computer simulator that learns the temperature, the weighted time, the average brightness, the applied data signal, and the initial data signal for each pixel using the deep learning scheme.

Therefore, the microchip may input the data signal to the compensation model and thus generate a compensated data signal. The timing controller 70 may apply the generated compensated data signal to the data driver 40.

Figure 2:
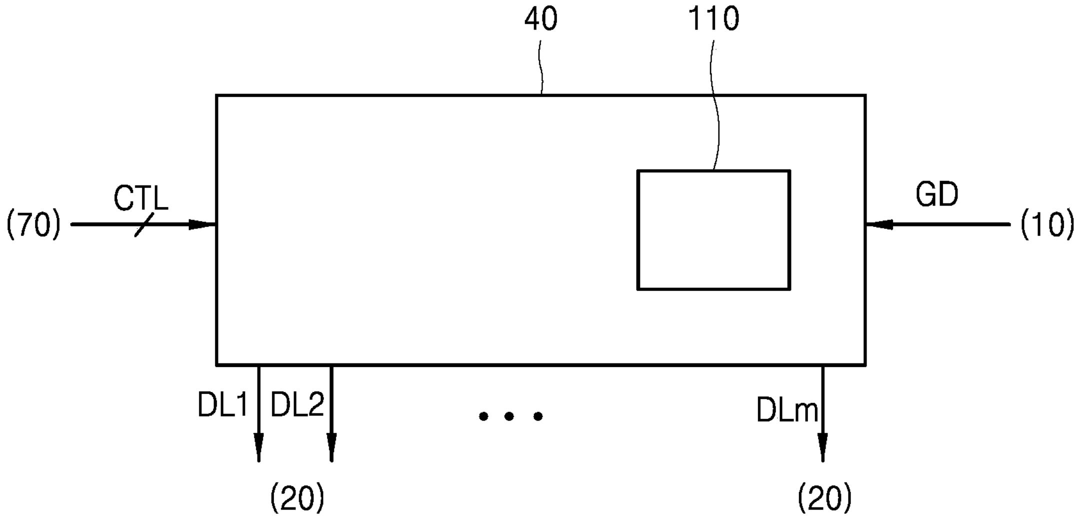
FIG. 2 is a drawing schematically showing an internal structure of a data driver according to an aspect of the present disclosure.
Figure 3:
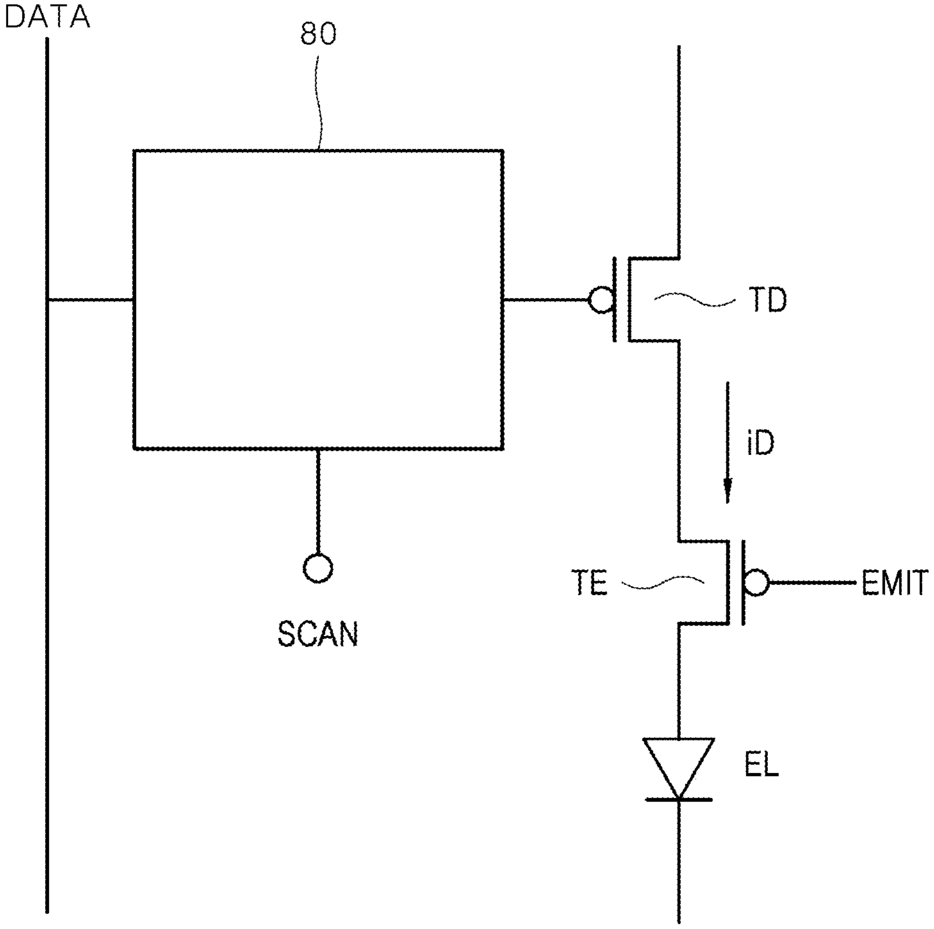
FIG. 3 is a drawing showing a pixel circuit diagram of a display device according to an aspect of the present disclosure.

FIG. 2 is a drawing schematically showing an internal structure of the data driver according to an aspect of the present disclosure. FIG. 3 is a drawing showing a pixel circuit diagram of a display device according to an aspect of the present disclosure.

Referring to FIG. 2, the data driver 40 according to an aspect of the present disclosure may include a lookup table 110 which stores respective correspondences between low potential voltages ELVSS and initialization voltages Vini and a plurality of gamma sets.

Therefore, when the data driver 40 receives a selected one gamma set from the luminance controller 10, the data driver 40 may select one low potential voltage ELVSS and one initialization voltage Vini corresponding to the selected one gamma set, based on the lookup table 110, and provide one low potential voltage ELVSS and one initialization voltage Vini to the display panel 20 through the data lines DL1 to DLm.

The lookup table 110 may store therein the low potential voltage ELVSS and the initialization voltage Vini in the 60 Hz operation mode, and the low potential voltage ELVSS and the initialization voltage Vini in the 90 Hz operation mode such that the low potential voltage ELVSS and the initialization voltage Vini in the 60 Hz operation mode may be respectively different from the low potential voltage ELVSS and the initialization voltage Vini in the 90 Hz operation mode.

For example, the low potential voltage ELVSS and the initialization voltage Vini in the 60 Hz operation mode are stored in the lookup table 110 such that the low potential voltage ELVSS and the initialization voltage Vini in the 60 Hz operation mode are equal to each other. To the contrary, the low potential voltage ELVSS and the initialization voltage Vini in the 90 Hz operation mode may be stored in lookup table 110 such that the low potential voltage ELVSS and the initialization voltage Vini in the 90 Hz operation mode are different from each other.

Accordingly, in the 60 Hz operation mode, the data driver 40 may provide the low potential voltage ELVSS and initialization voltage Vini having the same value to the display panel 20, based on the lookup table 110. Further, in the 90 Hz operation mode, the data driver 40 may provide the low potential voltage ELVSS and the initialization voltage Vini to the display panel 20 such that the low potential voltage ELVSS and the initialization voltage Vini in the 60 Hz operation mode may be respectively different from the low potential voltage ELVSS and the initialization voltage Vini in the 90 Hz operation mode, and the difference between the low potential voltage ELVSS and the initialization voltage Vini in the 90 Hz operation mode is greater than a certain reference.

Referring to FIG. 3, each pixel PX may include a switching circuitry 80, a driving transistor TD, a light-emission control transistor TE, and an organic electroluminescent diode EL. In this connection, the organic electroluminescent diode EL may be referred to as a "light emitting diode" EL in a simpler manner.

The switching circuitry 80 may transmit the data signal DATA supplied from the data line DL to the driving transistor TD in response to the scan signal SCAN supplied from the scan line SL.

The switching circuitry 80 may be configured to have any of various structures that transmit the data signal DATA to the driving transistor TD. For example, the switching circuitry 80 may include a storage capacitor and a switching transistor connected to the data line and the scan line SL.

The driving transistor TD may adjust a current iD flowing in the organic electroluminescent diode EL based on the data signal DATA transmitted from the switching circuitry 80. In this connection, the luminance of the organic electroluminescent diode EL may be adjusted based on a magnitude of the current iD. The light-emission control transistor TE is connected to the driving transistor TD and the organic electroluminescent diode EL to control the light emission of the organic electroluminescent diode EL.

Specifically, when, in response to a light-emission control signal EMIT supplied from a light-emission control line, the light-emission control transistor TE is turned on, the current flowing in the driving transistor TD is transferred to the organic electroluminescent diode EL to emit light. When the light-emission control transistor TE is turned off, the current flowing in the driving transistor TD is not transmitted to the organic electroluminescent diode EL, so that the organic electroluminescent diode EL may not emit light.

In this way, the luminance of the organic light-emitting display device may be determined based on the magnitude of the current iD supplied from the driving transistor TD and a timing when the light-emitting transistor TE is turned on.

Figure 4:
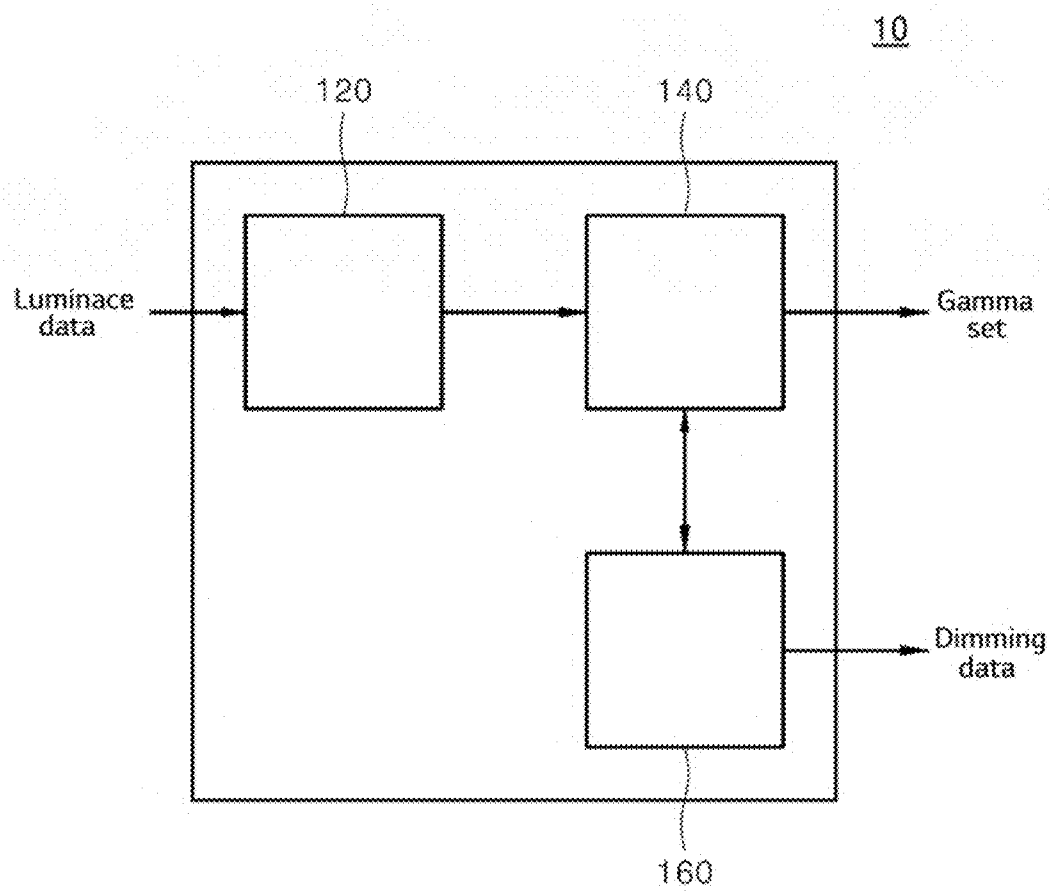
FIG. 4 is a block diagram showing a luminance controller according to an aspect of the present disclosure.
Figure 5:
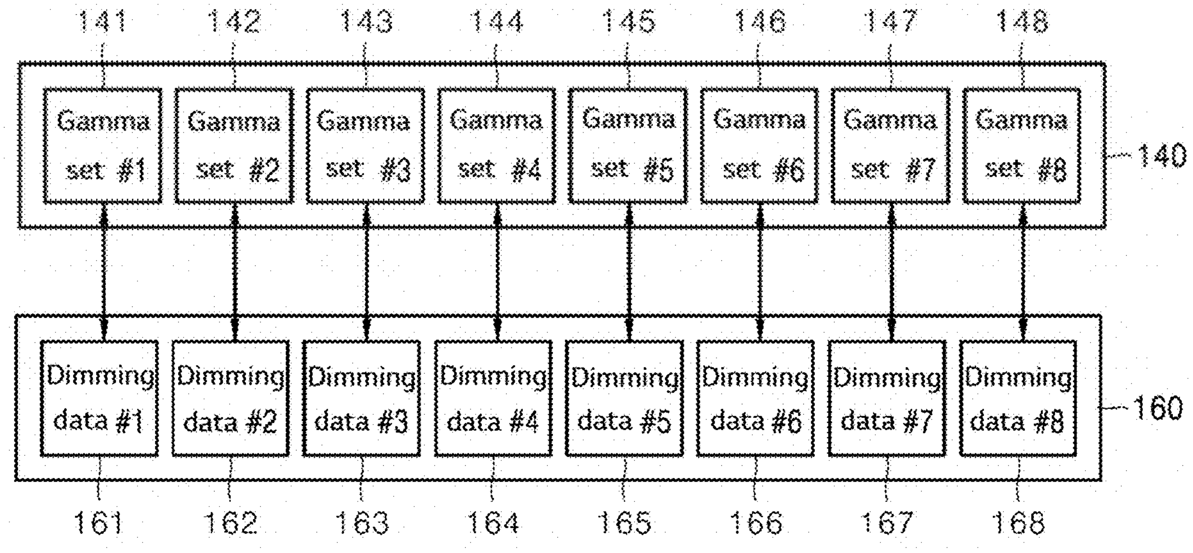
FIG. 5 is a block diagram showing a gamma set storage and a dimming data storage included in the luminance controller of FIG. 4.

FIG. 4 is a block diagram showing a luminance controller according to an aspect of the present disclosure. FIG. 5 is a block diagram showing the gamma set storage and dimming data storage included in the luminance controller of FIG. 4.

Referring to FIG. 4, the luminance controller 10 may include a gamma set selector 120, a gamma set storage 140, and a dimming data storage 160.

The gamma set selector 120 may receive the luminance data to be output to the display panel 20 from an external system.

In this connection, the externally input luminance data may represent a maximum luminance to be realized by the organic light-emitting display device, and thus may be within a range that may be realized by the organic light-emitting display device. For example, for an organic light-emitting display device capable of outputting up to 300 nit, the luminance data may be selected from a range of 0 to 300 nit.

The gamma set selector 120 may select a gamma set whose maximum luminance matches the luminance data from the lookup table 110 in which the plurality of gamma sets are stored.

Referring to FIG. 5, the gamma set storage 140 may include, for example, a first gamma set 141 to an eighth gamma set 148.

Each of the gamma sets 141, 142, 143, 144, 145, 146, 147, and 148 may store therein gamma data corresponding to each gray level. For example, for an organic light-emitting display device operating at a 8-bits manner, each of the gamma sets 141, 142, 143, 144, 145, 146, 147, and 148 may store therein gamma data corresponding to 0 to 225 gray levels.

The gamma set 141, 142, 143, 144, 145, 146, 147, or 148 selected by the gamma set selector 120 together with corresponding dimming data 161, 162, 163, 164, 165, 166, 167, or 168 stored in the dimming data storage 160 may be transmitted to each pixel through the data driver 40 and the light-emission controller 50.

In one example, a luminance level at which the organic light-emitting display device outputs an image may be determined based on the gamma set 141, 142, 143, 144, 145, 146, 147, or 148 and the corresponding dimming data 161, 162, 163, 164, 165, 166, 167, or 168.

The gamma data stored in each of the gamma sets 141, 142, 143, 144, 145, 146, 147, and 148 may be a preset experimental value capable of optimizing the image quality of the organic light-emitting display device. Neighboring gamma sets may be connected linearly to each other using interpolation. FIG. 5 shows eight gamma sets 141, 142, 143, 144, 145, 146, 147, and 148. However, the number of the gamma sets 141, 142, 143, 144, 145, 146, 147, and 148 which are stored in the gamma set storage 140 is not limited thereto and may vary.

The gamma set selector 120 may select one of the gamma sets 141, 142, 143, 144, 145, 146, 147, and 148 whose the maximum luminance, that is, the luminance corresponding to gamma data corresponding to the 225 gray level matches the externally input luminance data.

The dimming data storage 160 may store a first dimming data 161 to an eighth dimming data 168 respectively corresponding to the first gamma set 141 to the eighth gamma set 148.

Each of the dimming data 161, 162, 163, 164, 165, 166, 167, and 168 may refer to an off duty ratio indicating a ratio of a time duration for which the organic electroluminescent diode is turned off within one frame.

The dimming data 161, 162, 163, 164, 165, 166, 167, and 168 may be the same as or different from each other. As described above, the luminance of the organic light-emitting device may be determined based on the gamma set 141, 142, 143, 144, 145, 146, 147, or 148 and the dimming data 161, 162, 163, 164, 165, 166, 167, or 168, or may be determined based on the same dimming data 161, 162, 163, 164, 165, 166, 167, and 168. Thus, when the dimming data 161, 162, 163, 164, 165, 166, 167, and 168 are the same as each other, and the gamma sets 141, 142, 143, 144, 145, 146, 147, and 148 are different from each other, the device may output different luminance levels.

In one example, the luminance level at which the organic light-emitting display device outputs an image may be determined based on the gamma set 141, 142, 143, 144, 145, 146, 147, or 148 and the corresponding dimming data 161, 162, 163, 164, 165, 166, 167, or 168.

As described above, the luminance level at which the organic light-emitting display device outputs an image is determined based on the gamma set 141, 142, 143, 144, 145, 146, 147, or 148 and the corresponding dimming data 161, 162, 163, 164, 165, 166, 167, or 168. Thus, when the dimming data 161, 162, 163, 164, 165, 166, 167, and 168 are the same as each other, and the gamma sets 141, 142, 143, 144, 145, 146, 147, and 148 are different from each other, the device may output different luminance levels.

The neighboring dimming data 161, 162, 163, 164, 165, 166, 167, and 168 may be linearly connected to each other using an interpolation method. FIG. 5 shows 8 dimming data 161, 162, 163, 164, 165, 166, 167, and 168. The dimming data 161, 162, 163, 164, 165, 166, 167, and 168 respectively correspond to the gamma sets 141, 142, 143, 144, 145, 146, 147, and 148. Thus, the number of dimming data 161, 162, 163, 164, 165, 166, 167, and 168 may vary according to the number of gamma sets 141, 142, 143, 144, 145, 146, 147, and 148.

Figure 6:
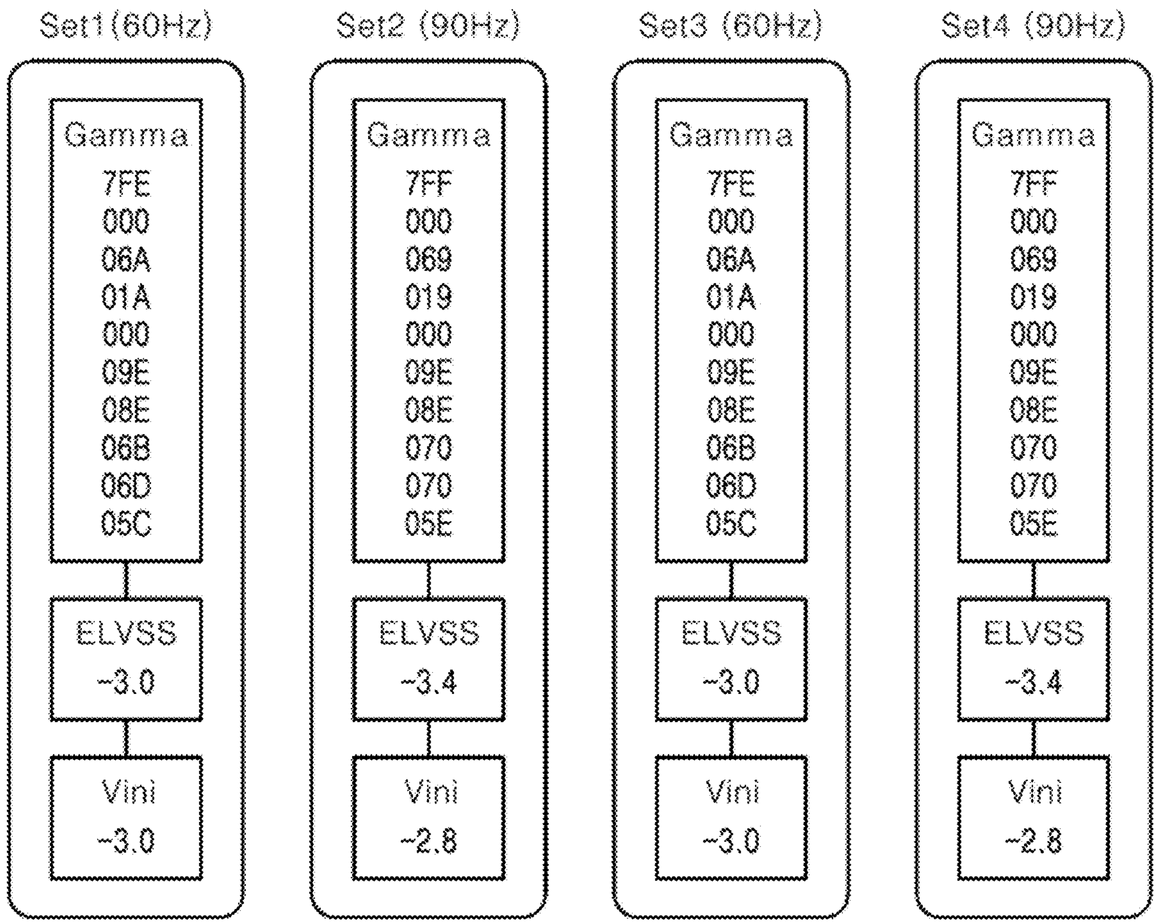
FIG. 6 is a drawing showing a gamma set, a low potential voltage, and an initialization voltage set in a lookup table of a data driver according to an aspect of the present disclosure.

FIG. 6 is a drawing showing the gamma set, the low potential voltage, and the initialization voltage set in the lookup table of the data driver according to an aspect of the present disclosure.

Referring to FIG. 6, the lookup table 110 of the data driver 40 according to an aspect of the present disclosure stores therein, for example, a first gamma set Gamma Set 1 to a fourth gamma set Gamma Set 4.

Each of the first Gamma Set 1 and the third gamma set Gamma Set 3 may correspond to the 60 Hz operation mode and thus may store therein the gamma voltage, the low potential voltage ELVSS, and the initialization voltage Vini used in the 60 Hz operation mode.

For example, each of the first gamma set Gamma Set 1 and the third gamma set Gamma Set 3 may store therein gamma voltages used in the 60 Hz operation mode at addresses such as 7FE, 000, 06A, 01A, 000, 09E, 08E, 06B, 06D, 05C, etc. The low potential voltage ELVSS is set to −3.0 V, while the initialization voltage Vini is set to −3.0 V. That is, in each of the first and third gamma sets Gamma Set 1 and 3, the low potential voltage ELVSS and the initialization voltage Vini used in the 60 Hz operation mode have the same voltage value.

Further, each of the second Gamma Set 2 and the fourth gamma set Gamma Set 4 may store therein the gamma voltage, the low potential voltage ELVSS, and the initialization voltage Vini used in the 90 Hz operation mode.

In one example, each of the second gamma set Gamma Set 2 and the fourth gamma set Gamma Set 4 may store therein gamma voltages used in the 90 Hz operation mode at addresses such as 7FF, 000, 069, 019, 000, 09E, 08E, 070, 070, and 05E. The low potential voltage ELVSS is set to −3.4 V. The initialization voltage Vini is set to −2.8 V. That is, the low potential voltage ELVSS and the initialization voltage Vini used in the 90 Hz operation mode as stored in each of the second and fourth gamma sets Gamma Set 2 and 4 are respectively different from the low potential voltage ELVSS and the initialization voltage Vini used in the 60 Hz operation mode. Further, the low potential voltage ELVSS and the initialization voltage Vini used in the 90 Hz operation mode as stored in each of the second and fourth gamma sets Gamma Set 2 and 4 are different from each other. A difference between the low potential voltage ELVSS and the initialization voltage Vini used in the 90 Hz operation mode as stored in each of the second and fourth gamma sets Gamma Set 2 and 4 may be greater than a certain reference value.

The first gamma set Gamma Set 1 may be selected by the luminance controller 10 in the 60 Hz operation mode. When the data driver 40 receives the selected first gamma set Gamma Set 1 from the luminance controller 10, the data driver 40 may provide the low potential voltage ELVSS −3.0 V and the initialization voltage Vini −3.0 V corresponding to the first gamma set Gamma Set 1 selected based on the lookup table 110 to the display panel 20 through the data lines DL1 to DLm.

Further, the second gamma set Gamma Set 2 may be selected by the luminance controller 10 in the 90 Hz operation mode. When the data driver 40 receives the selected second gamma set Gamma Set 2 from the luminance controller 10, the data driver 40 may provide the low potential voltage ELVSS −3.4 V and the initialization voltage Vini −2.8 V corresponding to the second gamma set Gamma Set 2 selected based on the lookup table 110 to the display panel 20 through the data lines DL1 to DLm.

Figure 7:
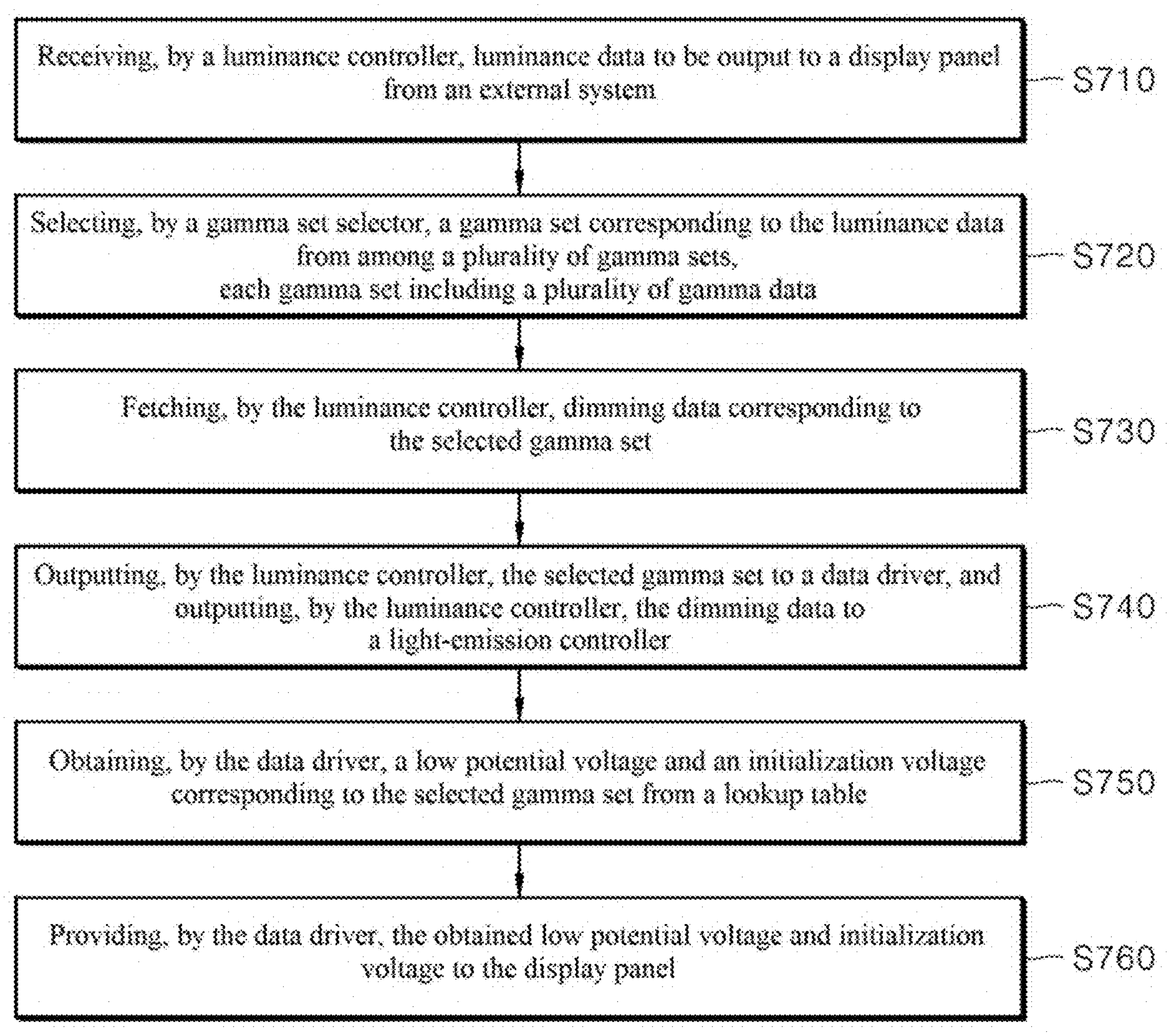
FIG. 7 is a drawing showing an operation flow chart for illustrating a method for providing a low luminance power of a display device according to an aspect of the present disclosure.

FIG. 7 is a drawing showing an operation flow chart for illustrating a method for providing a low luminance power of a display device according to an aspect of the present disclosure.

Referring to FIG. 7, the luminance controller 10 of the display device 100 according to an aspect of the present disclosure receives the luminance data that is to be output to the display panel 20 from an external system S710.

In this connection, the luminance data input from the external system may refer to data representing the maximum luminance at which the display panel 20 displays an image, and may be within a range that the display panel 20 may output. For example, for a display panel capable of outputting up to 300 nit, the luminance data may be selected from a range of 0 to 300 nit.

Subsequently, the gamma set selector 120 of the luminance controller 10 selects a gamma set corresponding to the luminance data from a plurality of gamma sets, each set including a plurality of gamma data S720.

For example, the gamma set selector 120 may select the second gamma set Gamma Set 2 corresponding to the luminance data from the plurality of gamma sets Gamma Set 1 to 4 as shown in FIG. 6.

Further, the maximum luminance of the gamma set is consistent with the luminance data input from the external system may be selected among the gamma sets stored in a second lookup table.

For example, a plurality of gamma sets may be included in the second lookup table. Each gamma set may include the plurality of gamma data corresponding to the gray levels. In this connection, the second lookup table refers to a storage separate from the lookup table 110 provided in the data driver 40 in FIG. 2, and may be located close to the luminance controller 10 and stores therein dimming data corresponding to each gamma set, as shown in FIG. 5.

The lookup table should be interpreted as a storage device in which a plurality of gamma sets are stored. Thus, a name of the lookup table is not limited to the lookup table.

Subsequently, the luminance controller 10 fetches the dimming data corresponding to the selected gamma set S730.

For example, the luminance controller 10 fetches, from the second lookup table, second dimming data Dimming data #2 corresponding to the selected second gamma set Gamma Set 2 as shown in FIG. 5.

In this connection, the luminance controller 10 may fetch the dimming data by selecting the dimming data corresponding to the selected gamma set from the second lookup table. That is, the dimming data corresponding to the plurality of gamma sets may be further included in the second lookup table. Thus, when the luminance data to be realized is input to the display panel 20, the luminance controller 10 may select the gamma set and the dimming data corresponding to a target luminance level from the second lookup table.

Then, the luminance controller 10 outputs the selected gamma set to the data driver 40, and outputs the corresponding dimming data to the light-emission controller 50 S740.

For example, in the 60 Hz operation mode, the luminance controller 10 may select the first gamma set Gamma Set 1 or the third gamma set Gamma Set 3 from the lookup table 110 shown in FIG. 6 and output the selected first gamma set Gamma Set 1 or third gamma set Gamma Set 3 to the data driver 40.

Further, in the 90 Hz operation mode, the luminance controller 10 may select the second gamma set Gamma Set 2 or the fourth gamma set Gamma Set 4 from the lookup table 110 shown in FIG. 6 and output the selected second gamma set Gamma Set 2 or fourth gamma set Gamma Set 4 to the data driver 40.

In this connection, the data driver 40 may generate data signal DATA based on the gamma set. The light-emission controller 50 may generate the light-emission control signal EMIT based on the dimming data. Based on the light-emission control signal EMIT, the organic electroluminescent diode EL may perform a dimming operation. In one aspect, the dimming operation may be a global dimming operation, which may be done over an entire area of the display panel 20. In another aspect, the dimming operation may be a local dimming operation which may be performed individually over partial areas of the display panel 20.

Then, the data driver 40 obtains the low potential voltage ELVSS and the initialization voltage Vini corresponding to the selected gamma set from the lookup table 110 S750.

In this connection, the lookup table 110 stores therein one low potential voltage ELVSS and one initialization voltage Vini corresponding to each of the plurality of gamma sets, as shown in FIG. 6.

For example, in the 60 Hz operation mode, when the data driver 40 receives the first gamma set Gamma Set 1 from the luminance controller 10, the data driver 40 may obtain the low potential voltage ELVSS −3.0 V and the initialization voltage Vini −3.0 V set in the first gamma set Gamma Set 1.

Further, in the 90 Hz operation mode, when the data driver 40 receives the second gamma set Gamma Set 2 from the luminance controller 10, the data driver 40 may obtain the low potential voltage ELVSS −3.4 V and the initialization voltage Vini −2.8 V set in the second gamma set Gamma Set 2.

Then, the data driver 40 provides the obtained low potential voltage ELVSS and initialization voltage Vini to the display panel 20 S760.

For example, in the 90 Hz operation mode, when the data driver 40 receives the second gamma set Gamma Set 2 from the luminance controller 10, the data driver 40 may be configured to provide the low potential voltage ELVSS −3.4 V and the initialization voltage Vini −2.8 V obtained from the lookup table 110 to the display panel 20.

Figure 8:
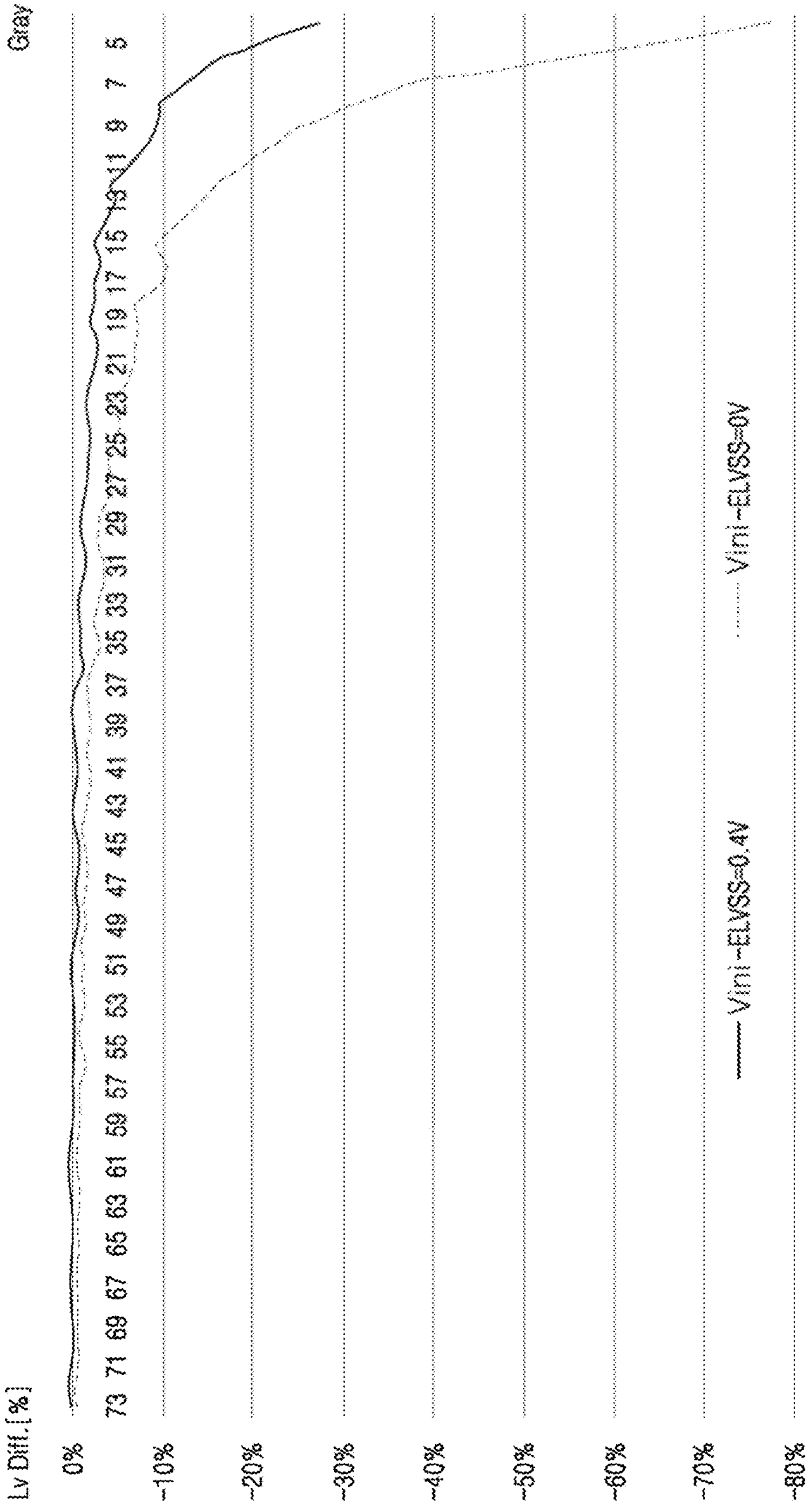
FIGS. 8 and 9 are graphs showing influence of a voltage gap between the low potential voltage and the initialization voltage of a display device according to the aspect of the present disclosure.
Figure 9:
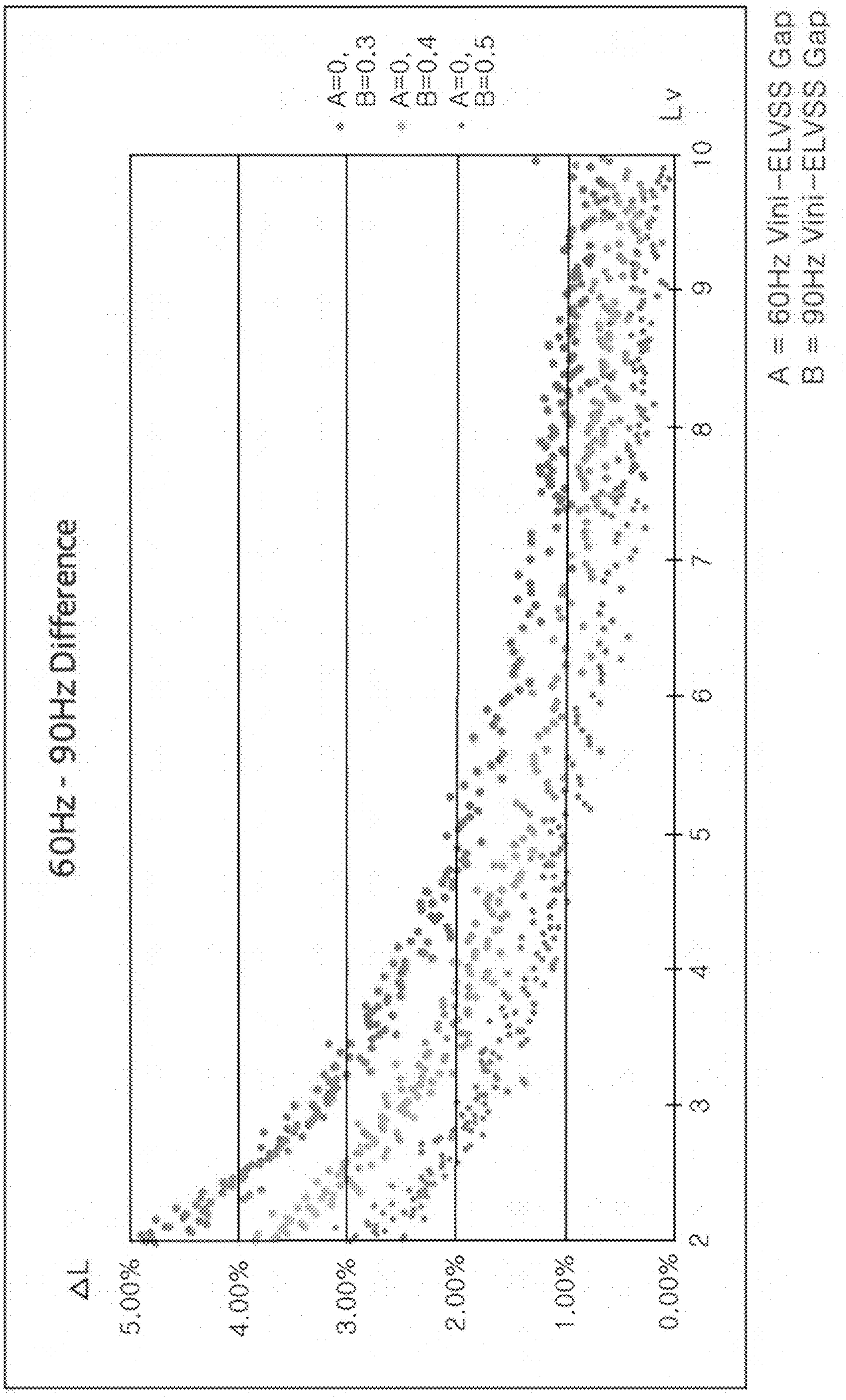

As described above, while the display device 100 according to the present disclosure applies the same data voltage Vdata to the display panel 20 in both of the 60 Hz operation mode and the 90 Hz operation mode, the display device 100 may provide, for example, the low potential voltage ELVSS −3.4 V and the initialization voltage Vini −2.8 V to the display panel 20 in the 90 Hz operation mode. Thus, as shown in FIG. 8, the influence of the voltage gap Gap between the low potential voltage ELVSS and the initialization voltage Vini could be identified. FIG. 8 and FIG. 9 are graphs showing the influence of the voltage gap between the low potential voltage and the initialization voltage in the display device according to the aspect of the present disclosure. In FIG. 8, it may be identified that a gray value when the voltage gap between the low potential voltage ELVSS and the initialization voltage Vini is 0 V and a gray value when the voltage gap between the low potential voltage ELVSS and the initialization voltage Vini is 0.4 V are different from each other. That is, it may be identified that when the voltage gap between the low potential voltage ELVSS and the initialization voltage Vini occurs, the device may compensate for the anode charging time, thereby improving the gray value. In FIG. 9, a horizontal axis denotes the luminance value Lv, while a vertical axis denotes a difference ΔL between the luminance values in the 60 Hz and 90 Hz operation modes. In the 60 Hz operation mode, all of the voltage gaps A between the low potential voltage ELVSS and the initialization voltage Vini are 0 V, while in 90 Hz operation mode, the voltage gaps B between the low potential voltage ELVSS and the initialization voltage Vini are 0.3 V, 0.4 V, and 0.5 V, respectively. It may be identified that the larger a difference between the voltage gaps in the 60 Hz operation mode and the 90 Hz operation mode, or the larger the voltage gap between the low potential voltage ELVSS and the initialization voltage Vini in the 90 Hz operation mode, the smaller the difference ΔT between the luminance values in the 60 Hz and 90 Hz operation modes.

Figure 10A:
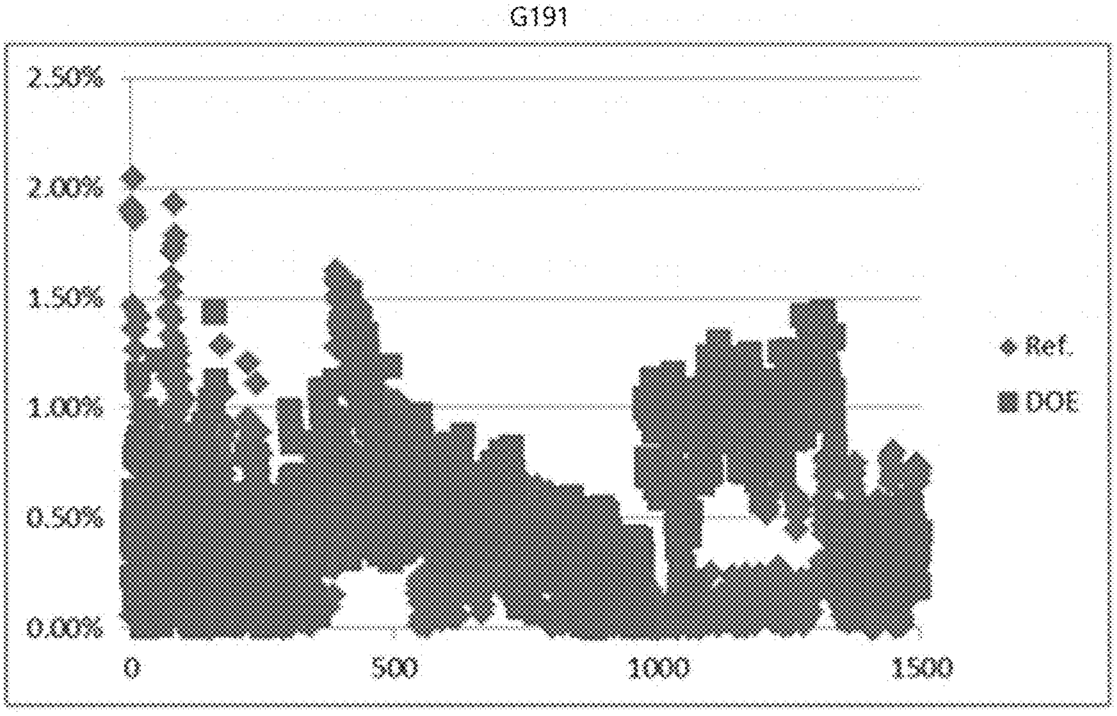
FIGS. 10A to 10F shows a graph showing compensating for an anode charging time based on a voltage gap between a low potential voltage and an initialization voltage in a 90 Hz operation mode of a display device according to the aspect of the present disclosure.
Figure 10B:
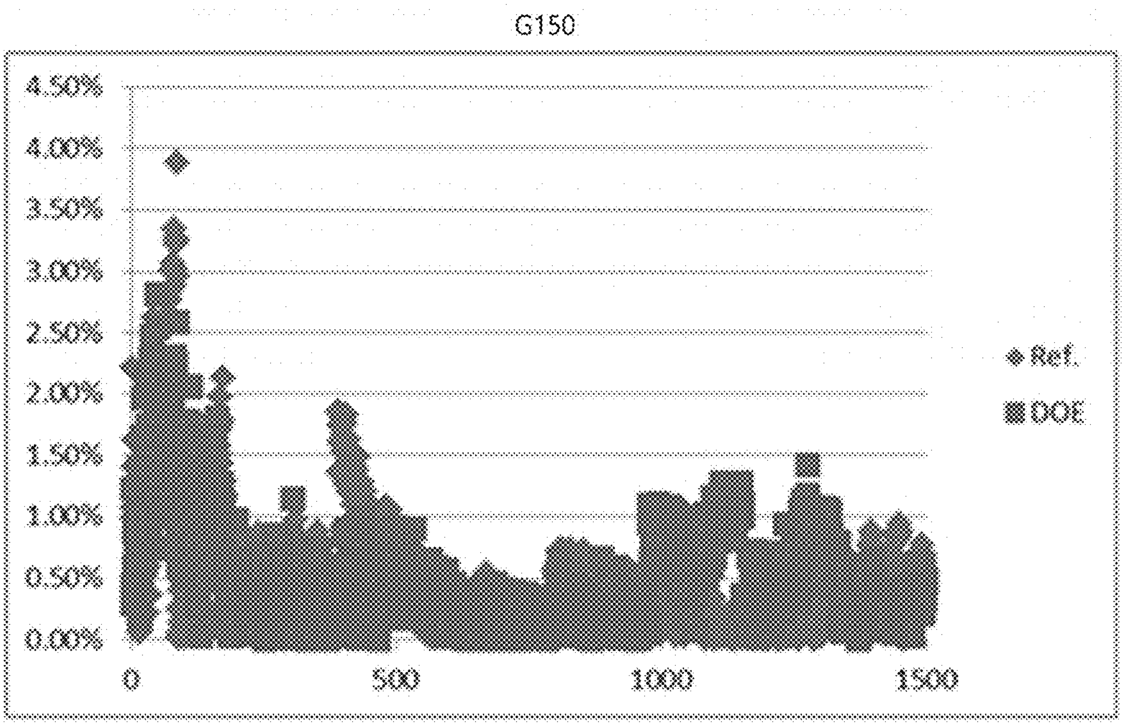
Figure 10C:
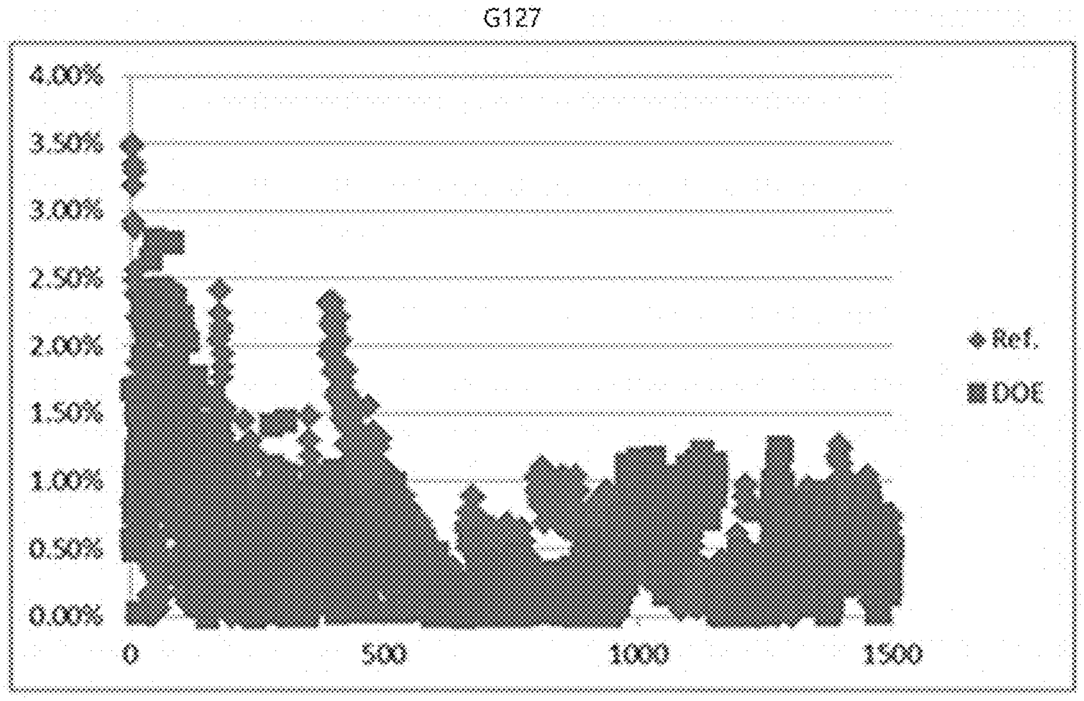
Figure 10D:
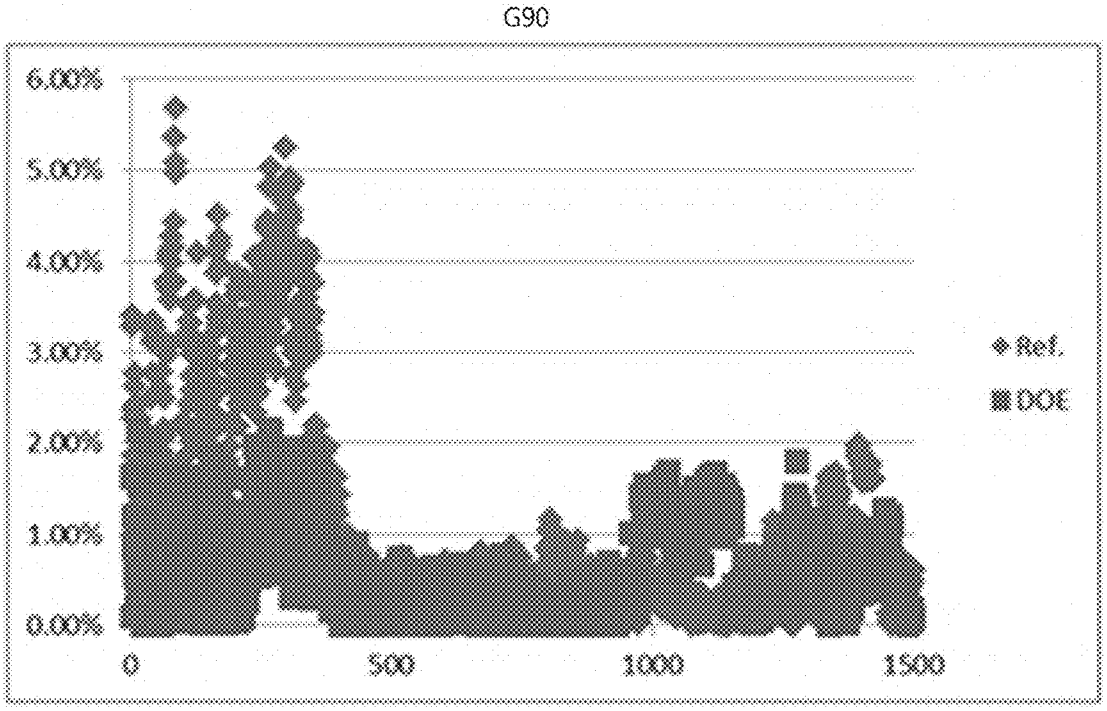
Figure 10E:
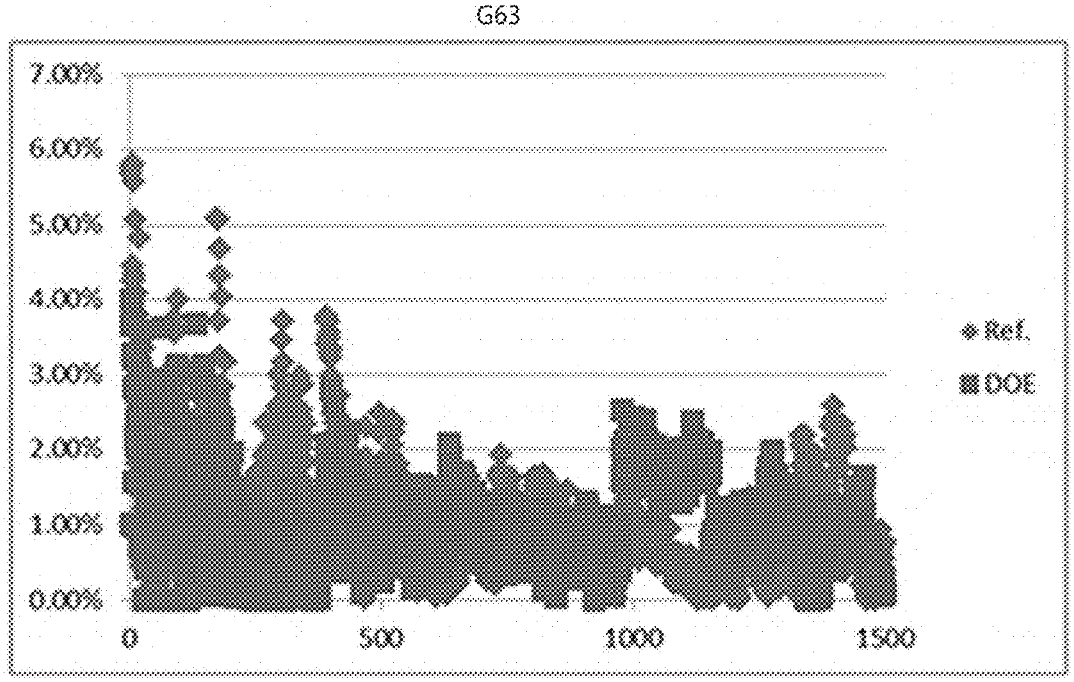
Figure 10F:
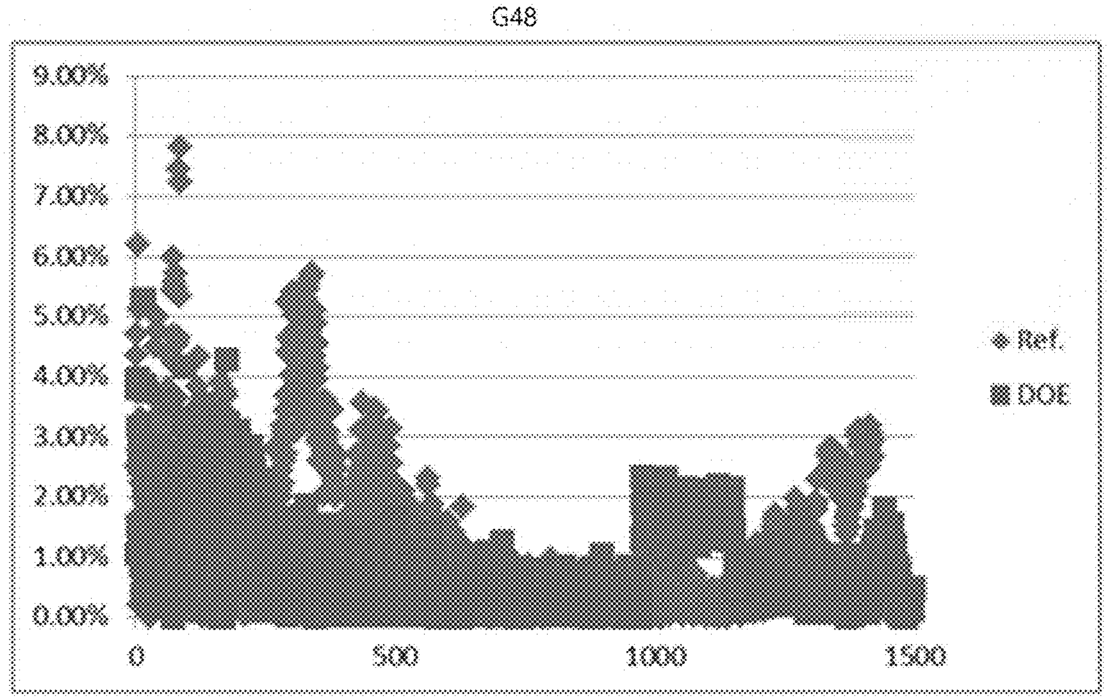

Further, in the display device 100 according to the aspect of the present disclosure, the low potential voltage ELVSS and initialization voltage Vini in the 90 Hz operation mode are respectively different than the low potential voltage ELVSS and initialization voltage Vini in the 60 Hz operation mode, and the voltage gap between the low potential voltage ELVSS and initialization voltage Vini in the 90 Hz operation mode may be secured, thereby compensating for the anode charging time, such that the seamlessness may be improved (DOE: red) compared to that in a conventional scheme (Ref: blue), as shown in FIGS. 10A to 10F. FIGS. 10A to 10F shows a graph showing compensating for the anode charging time based on the voltage gap setting between the low potential voltage and the initialization voltage in the 90 Hz operation mode in the display device according to the aspect of the present disclosure. FIG. 10A is a graph showing compensating for an anode charging time based on a voltage gap between a low potential voltage and an initialization voltage in the case of G191 in a 90 Hz operation mode of a display device according to the aspect of the present disclosure. FIG. 10B is a graph showing compensating for an anode charging time based on a voltage gap between a low potential voltage and an initialization voltage in the case of G150 in a 90 Hz operation mode of a display device according to the aspect of the present disclosure. FIG. 10C is a graph showing compensating for an anode charging time based on a voltage gap between a low potential voltage and an initialization voltage in the case of G127 in a 90 Hz operation mode of a display device according to the aspect of the present disclosure. FIG. 10D is a graph showing compensating for an anode charging time based on a voltage gap between a low potential voltage and an initialization voltage in the case of G90 in a 90 Hz operation mode of a display device according to the aspect of the present disclosure. FIG. 10E is a graph showing compensating for an anode charging time based on a voltage gap between a low potential voltage and an initialization voltage in the case of G63 in a 90 Hz operation mode of a display device according to the aspect of the present disclosure. FIG. 10F is a graph showing compensating for an anode charging time based on a voltage gap between a low potential voltage and an initialization voltage in the case of G48 in a 90 Hz operation mode of a display device according to the aspect of the present disclosure. In the improved method (DOE: red) according to the aspect of the present disclosure, there is no difference between the low potential voltage ELVSS −3.0 V and the initialization voltage Vini −3.0 V in the 60 Hz operation mode, while in 90 Hz operation mode, the low potential voltage ELVSS is set to −3.4 V, and the initialization voltage Vini is set to −2.8 V such that the voltage gap between the low potential voltage ELVSS and initialization voltage Vini in the 90 Hz operation mode occurs. In the conventional scheme (Ref; blue), the low potential voltage ELVSS is set to −3.0 V in both of the 60 Hz and 90 Hz operation modes, while the initialization voltage Vini is set to −2.8 V in both of the 60 Hz and 90 Hz operation modes, such that during the mode switching, the voltage gap between the low potential voltage ELVSS and initialization voltage Vini may be constant. Thus, the improved method (DOE: red) according to the aspect of the present disclosure may compensate for the anode charging time such that the seamlessness is improved.

In this connection, the power supply 60 may provide the high potential voltage ELVDD, the low potential voltage ELVSS and the initialization voltage Vini to the display panel 20. Thus, each pixel operates according to the low potential voltage ELVSS and the initialization voltage Vini applied from the data driver 40, such that the organic electroluminescent diode EL emits light.

Further, the power supply 60 generates power required for operation of the pixel array of the display panel 20 and the data driver 40 using a DC-DC converter. The DC-DC converter may include a charge pump, a regulator, a buck converter, a boost converter, etc. The power supply 60 adjusts a DC input voltage from a host system (not shown) to generates direct current power such as a gamma reference voltage, a gate on voltage VGL, a gate off voltage VGH, a high potential voltage ELVDD, a low potential voltage ELVSS, an initialization voltage Vini, etc. The gamma reference voltage is supplied to a gamma compensation voltage generator. The gate on voltage VGL and the gate off voltage VGH are supplied to a level shifter and the data driver 40.

Therefore, pixel power such as the high potential voltage ELVDD, the low potential voltage ELVSS, and the initialization voltage Vini are commonly supplied to the pixels PX.

In one example, although not shown in the drawing, the luminance controller 10 according to the present disclosure may include a gamma compensation voltage generator that divides the gamma reference voltage GVDD using a voltage dividing circuit and outputs gray level-based gamma compensation voltages to the data driver 40. The gamma compensation voltage generator may include a common gamma generator and first to third gamma generators.

The common gamma generator generates first and second reference voltages VREG1 and VREG2. The first reference voltage VREG1 refers to a high potential reference voltage divided into a gamma compensation voltage V0 to V255 representing a first luminance range L1. The first luminance range L1 refers to the luminance of an input image as realized on a screen AA in a normal operation mode. The first and second reference voltages VREG1 and VREG2 output from the common gamma generator are commonly supplied to the first to third gamma generators.

The second reference voltage VREG2 refers to a high potential reference voltage to generate a gamma compensation voltage V0 to V256 representing a second luminance range L2 in a boost mode. The second reference voltage VREG2 is set to a voltage higher than the first reference voltage VREG1.

The boost mode may refer to an operation mode in which the luminance should be locally increased on the screen AA. A fingerprint sensing mode may be set as one of the boost modes. When using an optical fingerprint sensor, and when the luminance of the pixels PX which are used as a light source is increased to a higher luminance than that in the normal operation mode, an amount of light received by an image sensor may be increased, thereby improving a sensing sensitivity of a fingerprint pattern.

When a finger is touched on the screen of the display panel 20, the display device 100 may generate a boost mode signal indicating the fingerprint sensing mode in response to an output signal from a touch sensor or a pressure sensor. When the boost mode signal is input from a host system to the data driver, the data driver 40 improves a pixel luminance of a fingerprint sensing area SA to a luminance set in the boost mode and then turns on the fingerprint sensing area SA at a high luminance level.

In the boost mode, the fingerprint sensing area SA may be set to a specific area within the screen AA. In the boost mode, pixels PX in the fingerprint sensing area SA may emit light at a luminance level in the second luminance range L2. In order to improve an amount of light which is emitted from the optical fingerprint sensor and is received by the image sensor, the boost mode is activated when a fingerprint sensing event occurs. Thus, the luminance in the fingerprint sensing area SA may be controlled to be higher than that in other pixels PX outside the fingerprint sensing area SA. When the fingerprint sensing event occurs, other pixels PX outside the fingerprint sensing area SA may display an input image at a luminance level in the first luminance range L1. The first luminance range L1 may be a luminance range of 2n gray levels that may be expressed by n bit pixel data where n is a positive integer of 8 or greater. The second luminance range L2 may be a luminance range of 2n+1 gray levels that may be expressed by n+1 bit pixel data. The highest luminance in the second luminance range L2 is higher than that in the first luminance range L1. In the second luminance range L2, the device presents a locally bright image in the screen AA or in a high luminance mode.

In the normal operation mode, the luminance of the pixels PX in the entire screen AA including the fingerprint sensing area SA may be controlled to the first luminance range L1. Therefore, in the normal operation mode, the highest luminance of all of the pixels PX in the screen AA is the highest luminance in the first luminance range L1.

The boost mode may be activated to improve the luminance of the screen AA in bright outdoor environments, product display modes, etc. In this case, in a mobile device or a wearable device to which the present disclosure is applied, the boost mode may be activated when it is determined depending on an output from an illumination sensor that use environment is bright or when a sample image is displayed in an exhibition hall. Therefore, according to the present disclosure, the luminance of the pixels PX may be enhanced to a level higher than that in the normal operation mode, when it is necessary to increase the luminance locally on the screen AA or in a bright environment or the product display mode.

As described above, when the display device 100 for selection of the gamma power according to an aspect of the present disclosure controls the luminance of the display panel based on the luminance data input from an external system, the device may select the gamma set corresponding to the luminance data and the dimming data corresponding to the gamma set and thus may perform precise dimming operation. Therefore, the device may fix or change the dimming data in a high luminance range or a low luminance range. Thus, the display quality of the organic light-emitting display device may be improved, compared to a conventional scheme that sequentially increases the dimming data as a pixel area changes from a high luminance range to a low luminance range.

As described above, the present disclosure may realize the display device and the method for providing a low luminance power therefor, in which the difference between the low potential voltage ELVSS and the initialization voltage Vini in the 90 Hz operation mode of the display device is set to be larger than that in the 60 Hz operation mode thereof, thereby compensating for an anode charging time.

Further, the present disclosure may provide the display device which includes the data driver which sets the low potential voltage ELVSS and the initialization voltage Vini corresponding to each gamma set and stores the same into the lookup table.

Further, the present disclosure may provide the display device which includes the data driver which selects the gamma set according to luminance data of image data, and selects the low potential voltage ELVSS and the initialization voltage Vini corresponding to the selected gamma set based on the lookup table, and provides the selected low potential voltage ELVSS and initialization voltage Vini to the display panel.

Further, the present disclosure may provide the method for providing the low luminance power of the display device that selects a gamma set according to luminance data of image data received from an external component, and selects a low potential voltage ELVSS and an initialization voltage Vini corresponding to the selected gamma set based on the lookup table, and provides the selected low potential voltage ELVSS and initialization voltage Vini to the display panel.

Although the aspects of the present disclosure have been described in more detail with reference to the accompanying drawings, the present disclosure is not necessarily limited to these aspects. The present disclosure may be implemented in various modified manners within the scope not departing from the technical idea of the present disclosure. Accordingly, the aspects disclosed in the present disclosure are not intended to limit the technical idea of the present disclosure, but to describe the present disclosure. the scope of the technical idea of the present disclosure is not limited by the aspects. Therefore, it should be understood that the aspects as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. A display device comprising:

a display panel having a plurality of scan lines and a plurality of data lines intersecting one another, and having a plurality of pixels, wherein each pixel is disposed at each of intersections therebetween and each pixel includes an organic electroluminescent diode;

a scan driver configured to apply a scan signal to the plurality of scan lines;

a data driver configured to apply a data signal to the plurality of data lines;

a luminance controller configured to receive luminance data to be output to the display panel; and a power supply unit configured to provide a high potential voltage, a low potential voltage, and an initialization voltage to the plurality of pixels, wherein the data driver configured to provide a first potential voltage and a first initialization voltage to the display panel in a first operation mode, to provide a second potential voltage and a second initialization voltage to the display panel in a second operation mode, and to determine a first voltage gap between the first potential voltage and the first initialization voltage and a second voltage gap between the second potential voltage and the second initialization voltage, wherein a first frequency of the first operation mode is smaller than a second frequency of the second operation mode, wherein the first voltage gap is smaller than the second voltage gap, wherein the larger a difference between a third voltage gap in the first operation mode and the second operation mode, or the larger the second voltage gap between the second potential voltage and the second initialization voltage, the smaller the difference between luminance values in the first operation mode and the second operation mode, wherein the third voltage gap is one of 0.3V, 0.4V, or 0.5V, wherein the luminance controller includes a gamma compensation voltage generator that divides a gamma reference voltage using a voltage dividing circuit and outputs gray level-based gamma compensation voltages to the data driver, the gamma compensation voltage generator includes a common gamma generator, wherein the common gamma generator generates first and second reference voltages, the first reference voltage is a high potential reference voltage divided into a gamma compensation voltage having a first luminance range, the first luminance range is the luminance of an input image as realized on a screen in a normal operation mode, the second reference voltage is a high potential reference voltage to generate a gamma compensation voltage having a second luminance range in a boost mode, the second reference voltage is set to a voltage higher than the first reference voltage, wherein when a boost mode signal is input from a host system to the data driver, the data driver sets a pixel luminance of a fingerprint sensing area to a luminance level in the second luminance range, which is the luminance of the boost mode, and wherein other pixels outside the fingerprint sensing area display an input image at a luminance level in the first luminance range, the highest luminance in the second luminance range is higher than that in the first luminance range.

2. The display device of claim 1, wherein the first operation mode is operated based on 60 Hz; and wherein the second operation mode is operated based on 90 Hz.

3. The display device of claim 1, wherein the data driver includes a look-up table storing the first potential voltage and the first initialization voltage in correspondence with one gamma set, and the second potential voltage and the second initialization voltage in correspondence with another gamma set.

4. The display device of claim 3, wherein the lookup table stores therein a first gamma set to a fourth gamma set, wherein each of the first gamma set and the third gamma set stores therein the first potential voltage and the first initialization voltage, and each of the second gamma set and the fourth gamma set stores therein the second potential voltage and the second initialization voltage.

5. The display device of claim 4, wherein the low potential voltage and the initialization voltage used in the 60 Hz operation mode each is set to −3.0V, and wherein the low potential voltage used in the 90 Hz operation mode is set to −3.4V, and the initialization voltage used in the 90 Hz operation mode is set to −2.8V.

6. The display device of claim 1, wherein the first potential voltage and the second potential voltage have different values from each other, and wherein the first initialization voltage and the second initialization voltage have different values from each other.

7. The display device of claim 1, wherein in the first operation mode, the first potential voltage and the first initialization voltage have the same values from each other; and wherein in the second operation mode, the second potential voltage and the second initialization voltage have different values from each other.

8. The display device of claim 1, wherein the data driver is further configured to:

provide the first potential voltage and the first initialization voltage having a same value to the display panel in the first operation mode; and provide the second potential voltage and the second initialization voltage having different values to the display panel in the second operation mode, wherein a difference between the second potential voltage and the second initialization voltage provided to the display panel in the second operation mode is larger than a predefined reference value.

9. The display device of claim 1, wherein the display device further comprises:

a light-emission controller configured to apply a light-emission control signal to the plurality of pixels; and a luminance controller configured to:

provide one gamma set selected from a plurality of gamma sets to the data driver, wherein each gamma set includes a plurality of gamma data; and provide dimming data corresponding to the selected gamma set to the light-emission controller.

10. The display device of claim 9, wherein, upon receiving the selected one gamma set from the luminance controller, the data driver provides the first potential voltage and the first initialization voltage or the second potential voltage and the second initialization voltage in correspondence with the selected one gamma to the display panel.

11. The display device of claim 9, wherein the luminance controller includes:

a gamma set selector configured to receive the luminance data to be output to the display panel from an external system, and determining the selected gamma set corresponding to the luminance data;

a gamma set storage configured to store the plurality of gamma sets; and a dimming data storage configured to store a plurality of dimming data corresponding to the plurality of gamma sets, wherein the gamma set selector selects the selected gamma set whose maximum luminance matches the luminance data from a lookup table in which the plurality of gamma sets are stored.

12. The display device of claim 11, wherein of the display panel performs a dimming operation based on the dimming data, and wherein the dimming data indicates an off duty ratio to control a light-emitting time duration of the organic electroluminescent diode.

13. The display device of claim 1, wherein a difference between the second potential voltage and the second initialization voltage provided to the display panel in the second operation mode is set to be larger than a difference between the first potential voltage and the first initialization voltage provided to the display panel in the first operation mode.

14. The display device of claim 1, wherein the display device further includes a microchip equipped with a compensation model that generates a compensation value for data voltage according to a current deviation of the each pixel, and wherein the compensation model is created by a computer simulator that learns a temperature, a weighted time, an average brightness, the applied data signal, and an initial data signal for the each pixel using a deep learning scheme.

* * * * *